United States Patent [19]
Fowler et al.

[11] 3,939,493
[45] Feb. 17, 1976

[54] TAPE LIFTER

[75] Inventors: Thomas M. Fowler, Longmont; Harvey R. Fraser, Jr.; Francis E. Hauke, both of Boulder, all of Colo.

[73] Assignee: International Business Machines Corporation, Armonk, N.Y.

[22] Filed: Sept. 30, 1974

[21] Appl. No.: 510,321

[52] U.S. Cl................................. 360/84; 360/102
[51] Int. Cl.²........................................ G11B 5/60
[58] Field of Search................... 360/84, 102, 130.

[56] References Cited
UNITED STATES PATENTS

| | | | |
|---|---|---|---|
| 3,255,307 | 6/1966 | Schuller................................ | 360/84 |
| 3,435,442 | 3/1969 | Ma et al............................... | 360/102 |
| 3,504,136 | 3/1970 | Maxey................................. | 360/84 |
| 3,840,894 | 10/1974 | Arseneault........................... | 360/84 |
| 3,855,524 | 12/1974 | Crawford............................. | 360/102 |

*Primary Examiner*—Alfred H. Eddleman
*Attorney, Agent, or Firm*—Homer L. Knearl

[57] ABSTRACT

Various pneumatic means are shown for lifting tape locally away from a rotating head as the rotating head moves. Only the tape in the vicinity of the head is lifted. The lifting is done with minimal pneumatic force, and done only locally about the head so that recovery time for read/write operations after a lifting operation is short, Air to lift the tape can be blown from passages around the head, from passages through the head, or from passages in front of the head. Local lifting about the head is enhanced by insuring that the pneumatic air flow to lift the tape does not easily dissipate in air space between the mandrel and the head rotor.

12 Claims, 5 Drawing Figures

TAPE LIFTER

BACKGROUND OF THE INVENTION

1. Field of the Invention

This invention relates to lifting tape off of a rotating head when the rotating head is not being used to read or write information on the tape.

2. Problem Background

In tape recorders using rotating heads one of the biggest technical problems is head and tape wear. The relative velocity between head and tape in a rotating head tape recorder is quite high, usually in the order of 1000 inches per second. At these speeds, contact between head and tape can damage heads and destroy tape in a matter of seconds.

To obviate this problem, rotating head recorders have utilized heads of particularly hard surface characteristics to resist wear, or alternatively, have designed heads that will fly within a few microinches of the surface of the tape. One example of a flying rotating head is described in copending commonly assigned application Ser. No. 486,028, filed July 5, 1974 and entitled "Slotted Rotating Head Which Flies Relative to Flexible Magnetic Media." The flying head is particularly effective to increase the longevity of the head and minimize wear on the tape.

The life of a flying head can be extended further by lifting the tape away from the flying head except during read/write operations. The flying height being on the order of tens of microinches creates an environment for the head that is susceptible to head crash damaging. Crashes between the flying head and the tape might occur because of debris getting between the head and the tape or other transient conditions. Therefore, it is desirable to lift the tape away from the head even further than the flying distance when the head is not reading or writing information on the tape.

Lifting the tape away from the head might be accomplished by using mechanical fingers as in U.S. Pat. No. 3,564,158. The difficulty with such a mechanical tape lifter is that the mechanical fingers are engaging the oxide surface of the tape. As the tape moves, the magnetic oxide can be damaged by the fingers and create debris that can subsequently cause a flying head to crash into the tape during read/write operations. Thus in very low flying heights, with high speed rotating heads, the mechanical fingers do not solve the problem of lifting the tape away from the head when the head is not being used to read or write.

An alternative solution to the mechanical fingers would be pneumatics on the rotor and/or mandrel to provide high air pressure to blow the tape away from the path of the rotating head. In other words, the entire length of tape wrapping the head could be pneumatically lifted away from the rotor. While this would definitly extend the life of the head, this alternative has at least two associated problems. First, a separate pneumatic system having a pressure several psi higher than an air bearing pneumatic system would have to be provided. Such an additional pneumatic system would be costly. Second, to lift the tape along the entire path of the rotating head would add delay in switching from a non-read/write operation to a read/write operation. In other words, in a non-read/write operation the tape would be lifted a relatively large distance off of the entire rotor and possibly the entire mandrel. When a read/write operation were desired, the thick air bearing during tape lift between the tape and mandrel would have to be collapsed and transient conditions in the tape would have to settle out before the head would fly at the very low flying height necessary for read/write operation. This collapse of the high air bearing and settling of transients would create a significant delay time in starting read/write operations with the tape drive.

SUMMARY OF THE INVENTION

In accordance with this invention, the above problem has been solved by a pneumatic tape lifter that lifts tape only locally about the head. Tape is lifted in the immediate vicinity of the head including not only the region of the head, but also surface area above a small portion of the rotor and mandrel adjacent the head. In effect, as the head rotates, a wave in the tape progresses with the motion of the head. This wave in the tape forms a pneumatic chimney to conduct air introduced at the head to the edges of the tape where it may escape.

Air pressure to provide this local tape lifting in the vicinity of the head is the same pressure as that provided by the pneumatic system generating the air bearings for the mandrel and the rotating-head rotor. Channels for inserting this lifting air flow can be provided around the head, through the head, or in front of the head.

As a further feature of the invention, the lifting of the tape is enhanced by providing a back pressure at the interface between the rotor and the mandrel so that the additional air flow blown in around the head does not leak away around the rotor. The back pressure might be provided by pneumatic pressure inside the mandrel, by providing a seal between the rotor and the mandrel, or by sealing the ends of the mandrel.

The great advantage of our invention is that the life of the flying head is extended by an order of magnitude over what it would be without the tape lifting. Further, this has been accomplished without significantly slowing down the switching time from a non-read/write operation to a read/write operation on the tape. Further, because the pressure used to create the wave in the tape is the same pressure as used to provide the air bearing for the tape, an additional pneumatic system is not required. The pneumatic system providing the air bearing may merely the tapped to provide the additional pneumatics for lifting the tape.

The foregoing and other features and advantages of the invention will be apparent from the following more particular description of preferred embodiments of the invention as illustrated in the accompanying drawings.

BRIEF DESCRIPTION OF DRAWINGS

FIG. 5 shows various techniques for providing the back pressure to prevent the air from the tape lifter from dissipating in the gap between the rotor and mandrel.

DESCRIPTION OF PREFERRED EMBODIMENTS

Figure 1:
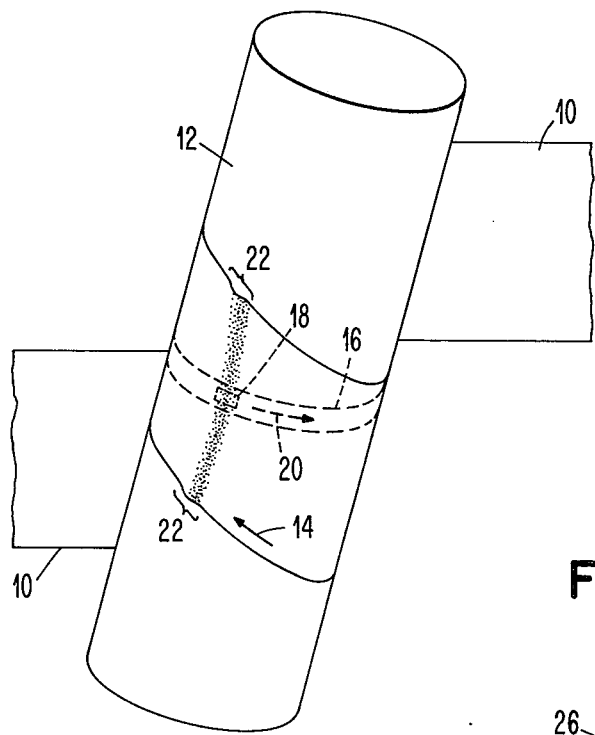
FIG. 1 shows the pneumatic wave created by the tape lifter as the head rotates.

Referring now to FIG. 1, an example of the tape lifter in operation is shown. Tape 10 is helically wrapped about the mandrel 12 and is moving continuously or incrementally about the mandrel as depicted by arrow 14. Mandrel 12 is preferably an air bearing mandrel. In the middle of the mandrel 12 mounted coaxially with the mandrel is a rotor 16 carrying the magnetic head 18. Magnetic head 18 is moving against the direction of motion of the tape 10 as shown by the dashed arrow 20.

With the tape lifter in operation, a wave 22 extending across the entire width of the tape in the vicinity of the head 18 is created. This wave 22 propagates along the tape about the mandrel 12 as the rotating head 18 moves. The tape lifter about the head 18 creates the wave and the wave moves with the head. In effect, a local tape lift in the immediate vicinity of the head is provided while the rest of the tape remains at its normal air bearing height above the surface of the mandrel 12 and the rotor 16.

The wave 22 is created by the air being forced up around, through, or in front of the head 18. This extra air produces a pneumatic chimney as it moves toward the edge of the tape. From the standpoint of the tape, there appears to be a wave in tape. From the standpoint of the air, the air is creating a chimney from the source of the air in the immediate vicinity of the head to the edge of the tape.

Figure 2:
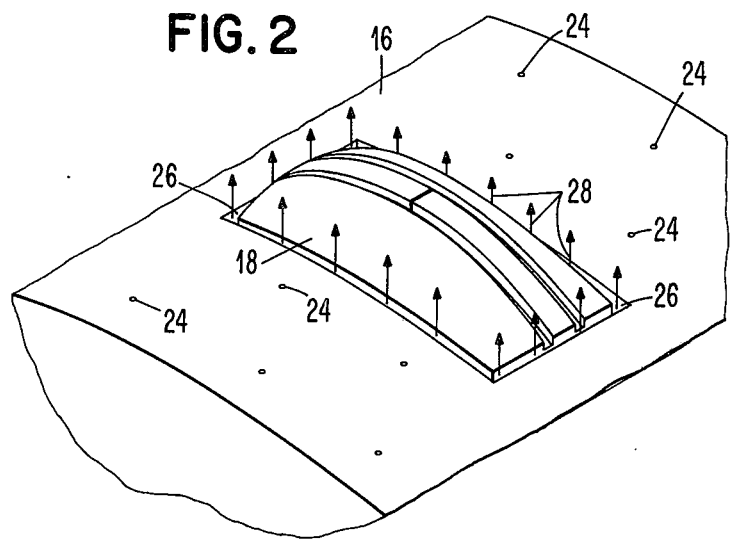
FIG. 2 shows one preferred embodiment for the tape lifter where air is blown up around a head positioned in the middle of the surface of a wide rotor.

Referring now to FIG. 2, a portion of the air bearing rotor 16 is shown with the slotted spherical head 18 mounted therein. As previously referenced, the slotted spherical head is described in copending commonly assigned application Ser. No. 486,028, filed July 5, 1974. A hydrostatic air bearing for the rotor 16 is provided by air flow through holes 24 in the surface of the rotor. Alternatively, the air bearing between the tape and the rotor might be produced hydrodynamically by the motion of the rotor surface. For the hydrostatic air bearing, a plenum inside the rotor provides the air pressure source to force the air through the holes 24. The pneumatic channels to provide air for the air bearing and the tape lift will be described hereinafter in more detail with reference to FIG. 5. For more detailed information about a hydrostatic rotor that could be used with the present invention, see copending commonly assigned application Ser. No. 488,341, filed July 15, 1974, entitled "Rotating Head Apparatus Having a Protruding Diameter Headwheel which Supports a Protruding Flying Head," and copending commonly assigned application Ser. No. 347,089, filed Apr. 2, 1973, entitled "Method and Apparatus for Supporting Tape Along a Path of a Rotating Head."

The head 18 in FIG. 2, as it is mounted in the rotor 16, has an air channel 26 that surrounds the edge of the head 18. Through channel 26 air can be forced as indicated by the arrows 28. It is the air under pressure coming up around the head 18 that lifts the tape off of the head. The pressure of the air represented by arrows 28 is very nearly the same pressure providing the air bearing. Accordingly, the tape is not blown way off of the rotor, but is instead merely lifted in the vicinity of the head. The air supplied through channel 26 comes up under the tape and escapes out at the edge of the tape. The air flow path forms the wave or chimney 22 as depicted in FIG. 1.

Figure 3:
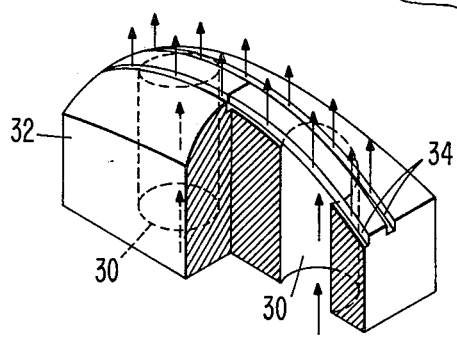
FIG. 3 shows a head mount with pneumatic channels inside the head to provide the pneumatic tape lift through the surface of the head.

Another preferred embodiment for lifting the tape off of the head is to blow air through passages in the head as depicted in FIG. 3. Head 32 could be mounted on a rotor 16 as depicted in FIG. 1 except without a channel 26. To force air up through the head to lift the tape, pneumatic chambers 30 are provided inside the head 32. Air under pressure in the chambers 30 moves into the slots 34 in the surface of the head to generate the lifting force to lift the tape off of the head. As an alternative to slots 34, holes could be used to conduct air flow from chamber 30 to surface of head 32. Air flow which lifts the tape off of the head would then move toward the edge of the tape via the wave or chimney effect created in the tape as depicted in FIG. 1.

Figure 4:
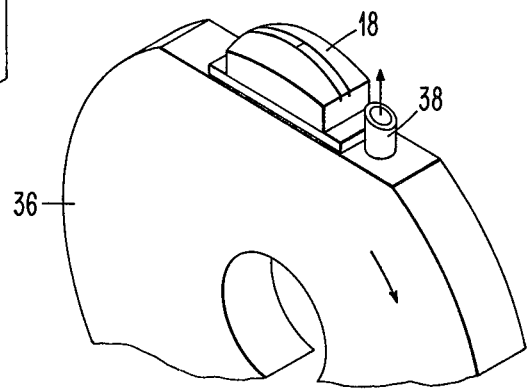
FIG. 4 shows a head mounted on a narrow rotor with an air jet positioned in front of the head to accomplish the tape lift.

Another preferred embodiment of the invention where the air is blown in front of the head is shown in FIG. 4. The same slotted head 18 is mounted on a narrow rotor not much wider than the width of the head. From pneumatic chambers inside the rotor 36 air is forced out a tube 38 to create a jet of air in front of the head 18. This jet of air 38 lifts the tape off of the head in the immediate vicinity of the head. As the air attempts to escape, it forms the chimney or wave 22 in the tape as depicted in FIG. 1.

Figure 5:
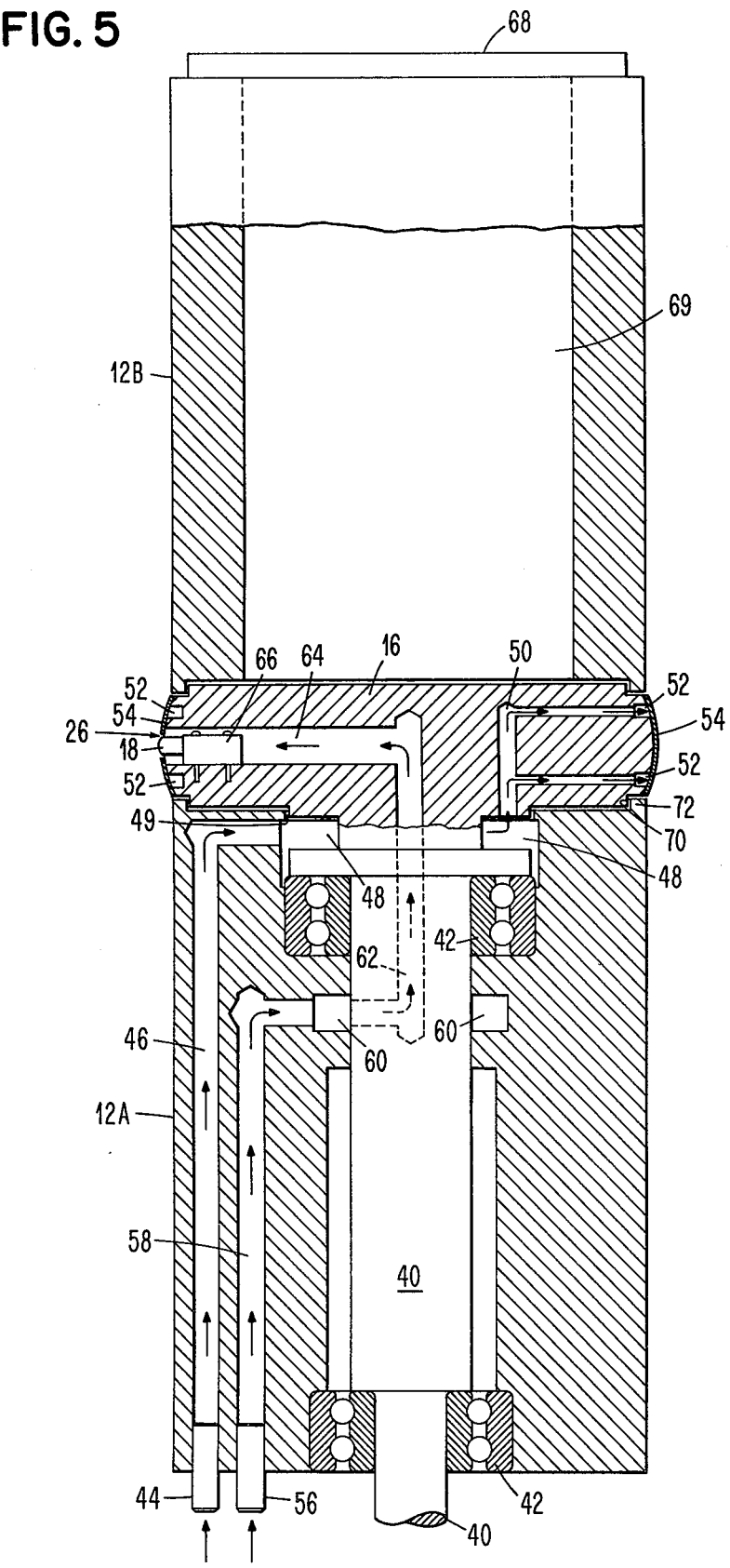
FIG. 5 shows a cross-section of a mandrel with a wide rotor and tape lifter in accordance with FIG. 2. In addition.

Referring now to FIG. 5, a cutaway is shown of the mandrel and rotor assembly. FIG. 5 diagrams the pneumatic system which provides air for the air bearing on the rotor and for the tape lifter. The mandrel 12 is split into two halves, both of which are rigidly mounted. Rotor 16 which carries the magnetic head 18 is mounted on a driven shaft 40. The shaft rotates in bearings 42 mounted inside the mandrel half 12A. The shaft 40 attached to the rotor 16 is driven by a motor not shown.

To provide the air for the air bearing above the surface of the mandrel, air enters port 44 and moves along air bearing duct 46 to annular chamber 48 adjacent the rotor. From annular chamber 48 the air can enter rotor ducts 50 in the rotor. The rotor ducts are distributed around the rotor 16 at regular intervals and provide a pneumatic connection from annular chamber 48 to channels 52 under the foil surface 54 of the rotor. The foil surface 54 contains holes 24 (FIG. 2) through which the air can pass to provide the air bearing between the rotor 16 and the tape.

Air under pressure to lift the tape off of the head is provided at port 56. Air entering port 56 is connected by lifter duct 58 to an annular chamber 60. Shaft duct 62 in the shaft 40 conveys the air to a chamber 64 underneath the head 18.

Head 18 is mounted to the rotor on mount 66. Mount 66 does not block air flow in the chamber 64 so that air may move past the mount and underneath the foil adjacent the head 18. A channel or space 26 is provided between the edge of the foil and the head 18. The space or channel 26 is shown in detail in FIG. 2, previously described.

Air pressure applied to ports 44 and 56 to pressurize the surface of the rotor and to lift tape off of the head comes from the same pressure supply. The tape lifting air flow is controlled by a valve, not shown, so that it is only applied to port 56 when it is desirable to lift the tape off of the head. For the tape lifter shown in FIGS. 2 and 5, the pressures involved are very low pressures, typically in the order of 15–30 inches of water (approximately one-half to 1 psi). In the alternative preferred embodiments shown in FIGS. 3 and 4, slightly higher pressures (3 psi) may be required for the tape lifter to obtain same lifting as that accomplished by FIG. 2 preferred embodiment. The difference is likely due to the more constricted air flow path through the head (FIG. 3) or through the jet in front of the head (FIG. 4). With such low pressures, the tape is not blown away from the mandrel by the additional air flow of the tape lifter. Instead, the tape lifter adds a small air flow to lift tape only in vicinity of head of forming the wave 22 (FIG. 1).

To enhance the tape lifting at such low pressures, it is desirable to provide a back pressure at the interface between the rotor and the fixed mandrels. Otherwise, the air blowing up around the head 18 might dissipate itself down between the edges of the rotor 16 and the mandrel halves 12A and 12B. At the interface to the mandrel half 12A back pressure between the rotor edge and the mandrel half 12A can be provided by close tolerance fit and by pressure in annular chamber 48. As can be seen in FIG. 5, annular chamber 48 has a close tolerance fit at edge 49 of the rotor 16. In addition, pressure in chamber 48 will buck against any air flow into chamber 48 from the space between the rotor 16 and mandrel half 12A.

Back pressure in the space between the rotor 16 and the mandrel half 12B could be achieved in at least three alternate ways. First, the tolerances could be held tight so that there would be very little space between the rotor 16 and the edge of the mandrel half 12B. Second, a plate 68 can be attached to the end of mandrel half 12B so that there is no flow path out of the mandrel. In other words, air seeping into the space between the rotor 16 and the mandrel half 12B would have no place to go because it could not exit out the end of the mandrel. Also, with plate 68 in place, the chamber 69 inside mandrel half 12B could be pressurized. Third, a labyrinth seal might be used between the edge of the rotor 16 and the mandrel half 12B. A labyrinth seal is simply a channel configured with a circuitous path so as to increase the impedance to air flow through the channel.

The space between the rotor 16 and the mandrel halves could be formed into such a labyrinth seal by shaping the edges of the mandrel halves and the rotor. As depicted in FIG. 5, a simple labyrith seal is shown between rotor 16 and the edges of both halves of the mandrel. The seal shown is a notch 70 in the edge of the rotor 16 and a lip 72 on the edges of the halves of the mandrel. Another advantage of the labyrinth seal at the top edge of the rotor is that air cannot get between rotor and mandrel and subsequently pass back out in the region where the tape does not wrap the rotor. Thus while all the above seals will enhance performance, the most effective seal is at the top edge between the rotor and mandrel. This seal is best accomplished by holding tight tolerances to keep separation between rotor and mandrel to a few thousandths of an inch or by using the labyrinth seal described above.

While the invention has been described in one particular environment of mandrel and pneumatic passages, it will be apparent to one skilled in the art that other mandrel configurations and pneumatic passage configurations could be used. Further, while the invention has been particularly shown and described with reference to preferred embodiments for the tape lifter, it will be understood by those skilled in the art that other changes in form and detail may be made therein without departing from the spirit and scope of the invention.

What is claimed is:

1. Apparatus for reducing wear on magnetic head and magnetic tape in a rotating-head tape recording device comprising:
    mandrel means for supporting the tape along the arcuate path of the rotating head;
    pneumatic means for generating an air flow locally about the head lifting the tape as the head rotates to avoid contact between head and tape when the head is not reading or writing information;
    said mandrel means providing uniform support of tape as tape wraps said mandrel means except that additional support of tape due to air flow generated by said pneumatic means forms a chimney between the tape and said mandrel means;
    said chimney conducts the additional air flow to the edge of the tape and travels with the rotating head lifting tape away from the head as the head passes under the tape.

2. The apparatus of claim 1 wherein said pneumatic means comprises:
    passages through the head to the surface of the head;
    means for supplying air flow to said passages whereby air will flow out the surface of the head and lift the tape as the head rotates.

3. The apparatus of claim 1 wherein said pneumatic means comprises:
    jet means for jetting air up in front of the head;
    means for supplying air under pressure to said jet means whereby air will flow up over the head and lift the tape as the head rotates.

4. The apparatus of claim 1 wherein said pneumatic means comprises:
    a channel surrounding the periphery of the head;
    means for supplying air flow to said channel whereby air will flow up around the periphery of the head and lift the tape as the head rotates.

5. The apparatus of claim 4 and in addition:
    back pressure means for inhibiting air flow away from the head except along said chimney.

6. The apparatus of claim 5 wherein said back pressure means comprises:
    means for sealing the space between a rotor carrying the rotating head and said mandrel means, said sealing means being formed as a labyrinth seal by the shape of said rotor and said mandrel means.

7. The apparatus of claim 5 wherein said back pressure means comprises:
    means for pressurizing the space between a rotor carrying the rotating head and said mandrel means so that air flowing up around the head will not dissipate between the rotor and said mandrel means.

8. Method for reducing wear on magnetic tape and magnetic head in a rotating-head magnetic recording device where during read and write operations the head flies relative to tape comprising the steps of:
    wrapping the tape around an air bearing mandrel and an air bearing rotor carrying the head;
    inserting additional air flow in the vicinity of the head when the head is not reading or writing information on magnetic tape;
    forming a wave in the tape with said additional air flow so that as the head rotates the wave propagates along the tape with the movement of the head and the tape is lifted away from the head as the head moves under the tape.

9. The method of claim 8 wherein said inserting step comprises the steps of:
  blowing additional air up around the periphery of the head;
  inhibiting the flow of air into the space between the air bearing rotor and the air bearing mandrel so that the additional air flow forms the wave in the tape.

10. The method of claim 9 wherein said inhibiting step comprises the steps of:
  sealing the space between the air bearing rotor and the air bearing mandrel with a labyrinth seal or tight tolerance spacing between rotor and mandrel;
  pressurizing the space between the air bearing rotor and the air bearing mandrel to buck against any air flow into said space from the surface of the mandrel and rotor.

11. The method of claim 8 wherein said inserting step comprises the steps of:
  blowing additional air through passages in the head and out the surface of the head;
  inhibiting the flow of air into the space between the air bearing rotor and the air bearing mandrel so that the additional air flow forms the wave in the tape.

12. The method of claim 8 wherein said inserting step comprises the steps of:
  blowing additional air up in front of and back over the top of the head;
  inhibiting the flow of air into the space between the air bearing rotor and the air bearing mandrel so that the additional air flow forms the wave in the tape.

* * * * *